United States Patent [19]
Mahaney

[11] Patent Number: 5,620,297
[45] Date of Patent: Apr. 15, 1997

[54] TRACTOR LOADER MOUNTING STRUCTURE

[76] Inventor: F. Allen Mahaney, 3709 Pawnee Pl., Sioux City, Iowa 51104

[21] Appl. No.: 599,958

[22] Filed: Feb. 14, 1996

[51] Int. Cl.$^6$ .................................................. B66C 23/00
[52] U.S. Cl. .......................................... 414/686; 172/275
[58] Field of Search ................................. 414/686, 685; 172/272–275

[56] References Cited

U.S. PATENT DOCUMENTS

| | | |
|---|---|---|
| 3,833,136 | 9/1974 | Spicer et al. . |
| 3,863,786 | 2/1975 | Frank . |
| 3,920,138 | 11/1975 | Frank . |
| 3,930,586 | 1/1976 | Frank . |
| 3,982,643 | 9/1976 | MacGregor et al. . |
| 4,247,420 | 1/1981 | Goertzen . |
| 4,264,264 | 4/1981 | McMillan et al. . |
| 4,275,984 | 6/1981 | Lenertz . |
| 4,285,628 | 8/1981 | Jankowski . |
| 4,436,477 | 3/1984 | Lenertz et al. . |
| 4,548,543 | 10/1985 | Lenertz et al. . |
| 4,637,772 | 1/1987 | Stumpe . |
| 4,798,511 | 1/1989 | Kaczmarczyk et al. . |
| 4,936,737 | 6/1990 | Rae et al. . |
| 5,190,437 | 3/1993 | Perry . |
| 5,224,816 | 7/1993 | Kaczmarczyk et al. . |
| 5,232,330 | 8/1993 | Rae et al. . |
| 5,252,022 | 10/1993 | Culp et al. . |
| 5,261,780 | 11/1993 | Perry . |

FOREIGN PATENT DOCUMENTS 1177448  11/1984  Canada .

OTHER PUBLICATIONS

Farmhand Loaders Brochure—X11340—XL1140—XL940—XL740.
The GB Line Model 3424 Loader Brochure.
The GB Line M110 Loader Brochure.
Frey Quicktach Loaders—Models 85 and 75.
Quicke 500 Series Brochure.
Stoll Drive–In–Frontloaders Brochure.
Case International Loaders & Blades Brochure.

Primary Examiner—Donald W. Underwood
Attorney, Agent, or Firm—Reising, Ethington, Barnard & Perry

[57] ABSTRACT

A loader attachment 30 is mounted on or dismounted from a tractor 12 by connecting uprights 36 and 38 to socket assemblies 32 and 34 or releasing the uprights from the socket assemblies. A boom assembly 40 is pivotally attached to the uprights 36 and 38 by pins 42. Both lift cylinders 104 and 112 pivot the boom assembly 40 relative to the uprights 36 and 38. The socket assemblies 32 and 34 are rigidly secured to the tractor 12. The connection is made by moving the troughs 128 into engagement with the pins 180 and then rotating the uprights 36 and 38 about the pins 180 until the vertical surfaces 142 and 150 on the upright wedges 140 and 148 contact the vertical surfaces 192 on the socket wedges 190 and the inclined surfaces 144 and 152 on the upright wedges 140 and 148 engage the inclined surfaces 194 on the socket wedges 190. The locking pins 186 are then inserted through bushings 184 and bores 134 to lock the uprights 36 and 38 to the sockets 32 and 34. The procedure is reversed for dismounting.

6 Claims, 5 Drawing Sheets

TRACTOR LOADER MOUNTING STRUCTURE

The present invention relates to a loader attachment mounted on a tractor and more particularly to a mounting structure which facilitates the mounting of a loader attachment on a tractor.

BACKGROUND OF THE INVENTION

Agricultural tractors are frequently equipped with loader attachments. Loader attachments are used on farms for numerous chores. These chores includes such tasks as cleaning livestock areas and buildings, handling bulk livestock feed, handling baled hay, and handling bulk seed containers. Hay bales that weighs over 1,000 pounds and seed containers that hold several hundred pounds of seed cannot be moved manually. Today a tractor equipped with a loader attachment is a necessity on most farms.

Loader attachments interfere with many agricultural tractor functions. They increase tractor length, increase tractor weight, may increase tractor height, reduce operator visibility, and shift weight from the rear wheels to the front steered wheels. Some farmers have avoided loader attachment interference with other tractor functions by having a tractor dedicated to loader use only and having other tractors that perform functions that do not require a loader attachment. Dedicating a tractor to loader use only is an expensive solution for many farmers.

The development of loader attachments that can be rapidly connected to a tractor and rapidly removed from a tractor has made it practical, for example, for a farmer to connect a loader attachment to a tractor to feed livestock before breakfast and to remove the loader and cultivate corn with a row crop cultivator mounted on the tractor after breakfast. Loader attachments that can be rapidly connected to a tractor are important labor saving devices for farmers and others who need to employ tractors with loaders for some tasks and tractors without loaders for other tasks. Some of the loader attachments with rapid connection capabilities that are currently available can be removed from a tractor in less than ten minutes and reattached to a tractor in about the same time. However, these loader all experience some problems.

Loaders with quick or rapid coupling features have pins or other locking members that lock the loader to the tractor. For these locking members to be inserted into a locking position, loader members have to be in horizontal and vertical alignment. The connecting and locking members also have to be able to transfer a force between the tractor and the loader bucket without failing. Many of the loaders that are currently available are difficult to align relative to the tractor so that they can be locked to the tractor. Many of these currently available loaders also have components that are frequently overloaded and damaged.

Alignment between loaders and tractors is controlled in at least one direction by adjustable stops on some loaders with rapid attaching capability. Adjustable stops can require frequent adjustment and may be overloaded. With adjustable stops a given loader can most likely only be mounted on one tractor without changing the adjustments. The adjustments do not allow for wear if the mating parts are subjected to wear. The adjustments require readjustment to correct for wear of mating parts.

SUMMARY OF THE INVENTION

An object of the invention is to provide a loader attachment having a rapid coupling capability for connecting an upright to a socket mounted on the tractor that aligns mating members without manual manipulation. Another object of the invention is to provide a loader attachment having a rapid coupling capability with a locking pin that is isolated from vertical forces and forces that tend to move the bucket and the tractor horizontally toward each other. A further object of the invention is to provide a loader attachment with wedge blocks that align the uprights and the sockets and transfer forces to the sockets and the tractor that tend to lift the uprights and tend to move the uprights to the rear relative to the tractor. A still further object of the invention is to provide a loader attachment with nonadjustable mating surfaces between the sockets and the uprights that are hardened to resist wear.

The loader attachment has a socket attached to the left side of a tractor and another socket connected to the right side of the tractor. The sockets are relatively small and only cause minimal reduction of a tractor operator's field of view. An upright is received in the left side socket and another upright is received in the right side socket. The loader boom is pivotally attached to both uprights.

Hydraulic boom cylinders are attached to the uprights and to the boom. A tractor driven hydraulic systems supplies hydraulic fluid to the boom cylinders to extend the boom cylinders and raise the boom. The hydraulic system also supplies hydraulic fluid to the boom cylinders to retract the cylinders and lower the boom.

A bucket or other special purpose attachment is pivotally attached to the forward end of the boom. Hydraulic tilt cylinders are attached to the boom and to the bucket for pivoting the bucket. Hydraulic fluid extends the tilt cylinders to rotate the bucket in the direction to dump material in the bucket out. Hydraulic fluid can also retract the tilt cylinders to rotate the bucket in a direction that retains material in the bucket.

The sockets attached to the tractor have a fixed socket lower pivot member. The uprights have a lower pivot engaging surface that engages the socket pivot members and holds the lower ends of the uprights. Socket wedges are secured to the sockets above the socket lower pivot members. The socket wedges each have two forwardly facing surfaces one of the forwardly facing surfaces is generally vertical. The other forwardly facing surface is an inclined surface, extends downwardly and rearwardly and also faces downwardly.

Upright wedges are secured to the uprights above the lower pivot engaging surfaces. The upright wedges each have two rearwardly facing surfaces. One of the rearwardly facing surfaces is generally vertical. The other rearwardly facing surface is inclined, extends downwardly and rearwardly and also faces upwardly.

The socket wedge vertical surfaces contact the upright wedge vertical surfaces to horizontally position the socket wedges relative to the upright wedges. The vertical surfaces of the socket wedges also transmit force in a horizontal forward direction from the tractor to the vertical surface on the upright wedge and to the loader boom. The incline surfaces of the socket wedges contact the incline surfaces of the upright wedges to move the uprights vertically downward relative to the sockets and to transfer upward force on the upright to the socket and the tractor.

The upright wedges also have angled surfaces that guide the uprights into the sockets if necessary the angled surfaces move the uprights transversely into a laterally centered position within the sockets. When the rearwardly facing surfaces of the upright wedges are in contact with the forwardly facing surfaces on the socket wedges, a locking pin can be slid through aligned apertures in each socket and mating upright to lock the loader boom to the tractor. The locking pins are loaded only when there is a load that tends to move the upper portion of the uprights forward and out of the sockets.

The foregoing and other objects, features and advantages of the tractor loader mounting structure will become apparent in view of the detailed description and the drawings described therein.

BRIEF DESCRIPTION OF THE DRAWINGS

The presently preferred embodiment of the invention is disclosed in the following description and in the accompanying drawings, wherein.

DESCRIPTION OF THE PREFERRED EMBODIMENT

In the following description, the terms front, rear, left, right, bottom, up and down will be as seen by the operator sitting on the seat 10 of the tractor 12 in a position to operate the tractor.

Figure 1:
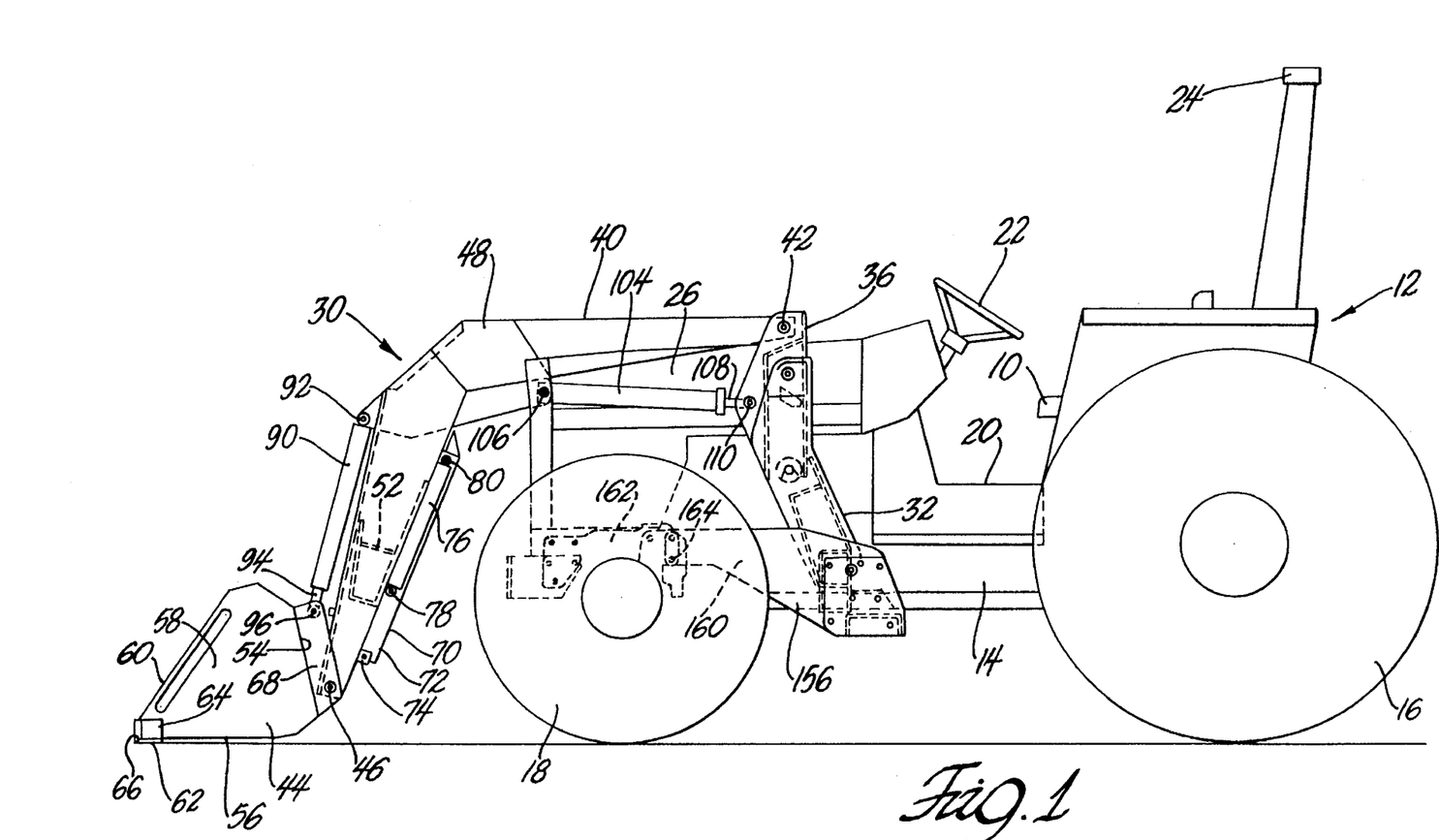
FIG. 1 is a side elevational view of a tractor with a loader mounted on the tractor.

The tractor 12 as shown in FIG. 1 is a chassis 14 supported by driven rear wheel 16 and driven and steered front wheels 18. An operator station 20 is provided on the rear portion of the chassis 14. A steering wheel 22, in front of the seat 10, is operable to turn the front wheels 18. A roll over protective structure 24 protects the operator in case of an upset. An engine is provided in an engine compartment 26 on the front portion of the chassis 14.

Figures 8, 9:
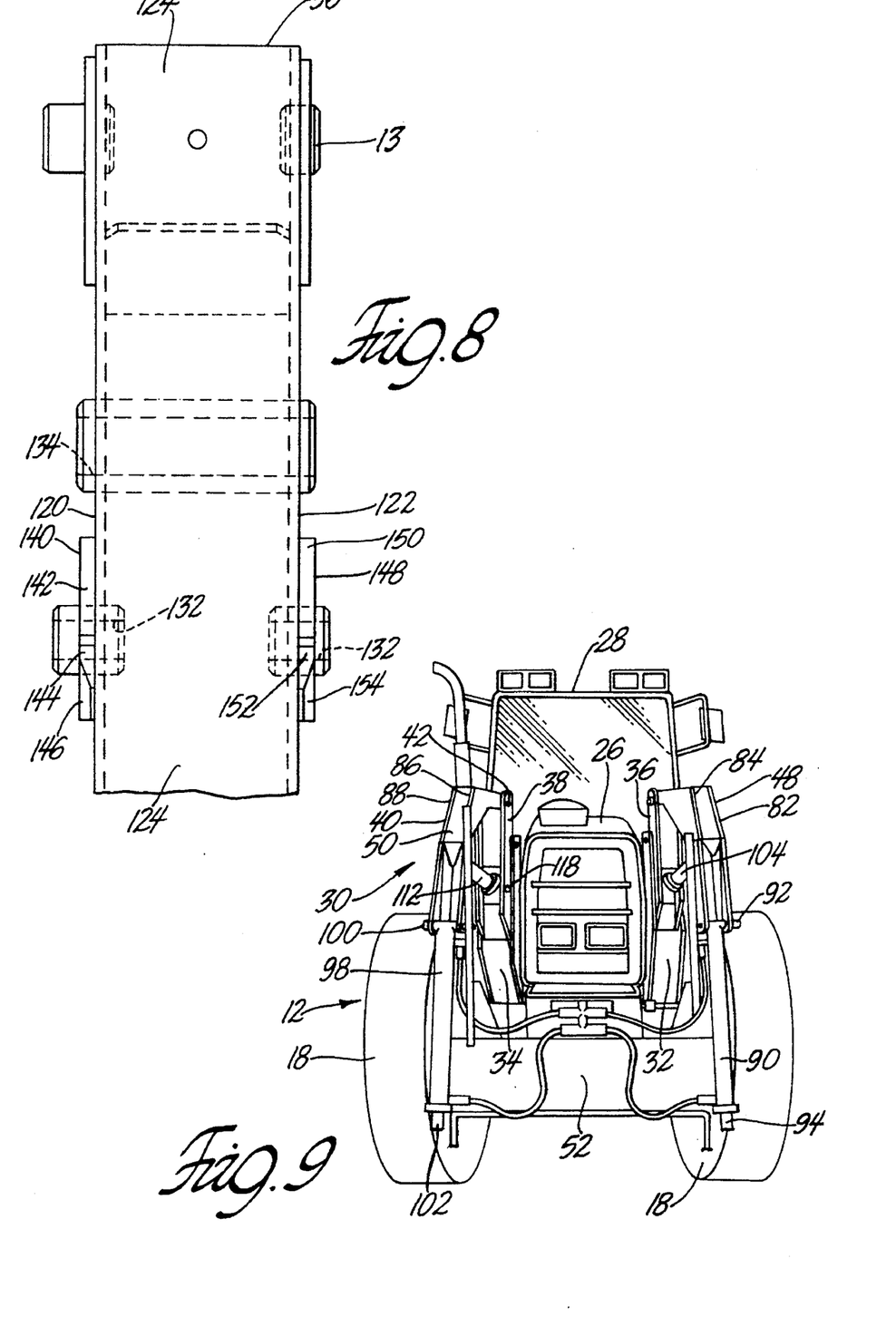
FIG. 8 is a rear view of an upright assembly taken along line 8—8 in FIG. 2.
FIG. 9 is a front perspective view of a tractor with a loader mounted on the tractor.

The tractor 12 shown in FIG. 9 is the same as the tractor shown in FIG. 1 except that the operator station is enclosed within a cab 28 with a built in roll over protective structure in place of the roll over protective structure 24. The tractor 12 is an agricultural tractor. Agricultural tractors 12 can also be used as industrial tractors if desired. They are basically the same.

The loader attachment 30 includes a left socket assembly 32 and a right socket assembly 34. Left and right uprights 36 and 38 attached to the socket assemblies 32 and 34. A boom assembly 40 is pivotally attached to the left and right uprights 36 and 38 by pins 42. The boom assembly 40 includes a left arm 48 and a right arm 50 that are joined together by an integral tubular beam 52 to form a rigid structure. A bucket assembly 44 is pivotally attached to the boom assembly 40 by a pair of pins 46.

The bucket assembly 44 has a rear wall 54, a bottom wall 56 and end walls 58 and 60. The end walls 58 and 60 are integral with the rear wall 54 and the bottom wall 56. A bar 62 is attached to a leading edge of the bucket bottom wall 56 by welding. The bar 62 has ends 64 that are bent 90 degrees to extend vertically upward. The ends 64 are welded to the end walls 58 and 60 to strengthen the leading edge of the bucket. The leading edge of the bar 62 has a beveled surface 66. Two pairs of spaced apart vertical parallel plates 68 are welded to the rear surface of the rear wall 54. The forward end of the left arm 48 is positioned between the left pair of vertical parallel plates 68. The pin 46 for attaching the bucket 44 to the left arm of the boom assembly 40 also passes through the left pair of vertical parallel plates 68. The forward end of the right arm 50 is positioned between the right pair of vertical parallel plates 68. The pin 46 for attaching the bucket 44 to the right arm of the boom assembly 40 also passes through the right pair of vertical plates 68.

A support stand assembly 70 is attached to the forward end of the left arm 48 of the boom assembly 40 as shown in FIG. 1. The support stand assembly 70 includes a support arm 72 which is pivotally attached to the left arm 48 by a pin 74. A strut 76 is pivotally attached to the left arm 48 by a pin 78. A pin 80 is removed to release the support arm 72 and the strut 76 from the storage position shown in FIG. 1. With the pin 80 removed, the support arm 72 pivots about the pin 74 toward the ground. The strut 76 also pivots about the pin 78. A passage through the free end of the strut 76 is aligned with a bore through a mid portion of the support arm 72 and the pin 80 is inserted through the passage through the free end of the strut and the aligned bore through the mid portion of the support arm 72 to hold the support arm in a support position. An identical support stand assembly 70 is attached to the right arm 50. When both support arms 72 are locked in a supporting position, they can support the boom assembly 40 when it is disconnected from the tractor 12.

An outside plate 82 and an inside plate 84 are welded to the left arm 48 of the boom assembly 40. An inside plate 86 and an outside plate 88 are welded to the right arm 50 of the boom assembly 40. A left bucket cylinder 90 has its cylinder end positioned between the plates 82 and 84 and is pivotally connected to the left arm by a pin 92. The free end of the rod 94 of the left bucket. cylinder 90 is positioned between the left pair of vertical parallel plates 68 on the bucket 44 and is pivotally secured by pin 96. A right bucket cylinder 98 has its cylinder end positioned between the plates 86 and 88 on the right arm 50 and is pivotally connected to these plates by a pin 100. The free end of the rod 102 of the right bucket cylinder 98 is positioned between the left pair of vertical parallel plates 68 on the bucket 44 and is pivotally secured by a right pin (not shown) that is in axial alignment with the pin 96 shown in FIG. 1.

A left boom lift cylinder 104 has its head end positioned between the plates 82 and 84 and is pivotally attached to the left arm 48 by a pin 106. The free end of the rod 108 of the left boom lift cylinder 104 is pivotally attached to the left upright 36 by a pivot pin 110. The head end of the right boom lift cylinder 112 is pivotally secured between the plates 86 and 88 on the right arm 50 by a pin in axial alignment with the pin 106. The free end of the rod of the right boom lift cylinder 112 is pivotally attached to the right upright 38 by a pivot pin 118.

Figure 2:
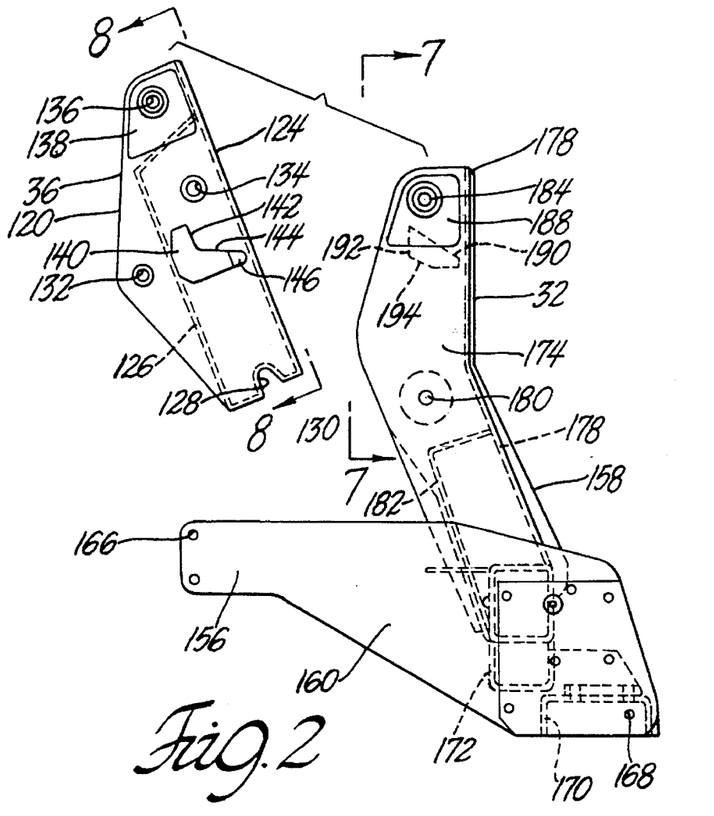
FIG. 2 is a side elevational view of the left socket assembly and the left upright assembly separated from the socket assembly.

The left upright 36 is identical to the right upright 38. The left upright 36 as shown in FIGS. 2 and 8 is a U-shaped housing with a pair of spaced apart parallel side walls 120 and 122 with an intrical rear bite 124. An internal reinforcement 126 is positioned between and welded to the side walls 120 and 122 to reinforce the upright 36. The internal reinforcement 126 is shaped to form a downwardly opening transverse trough 128 in the bottom of the upright 36 and is welded to the bottom of the bite 124 at 130. A reinforced transverse bore 132 receives the pivot pin 110 as described above. An upright lock pin bore 134 passes through the side walls 120 and 122 above the trough 128. A transverse boom pivot pin bore 136, which receives a pin 42, passes through the upper end of the upright 36. The pin 42 also passes through a bore in the rear of the boom assembly 40 positioned between the side walls 120 and 122 to pivotally connect the boom to the upright 36. Plates 138 are welded to the side walls 120 and 122 to reinforce the bore 136.

A left upright wedge 140 is welded to the outside surface of the side wall 120 of the upright 36. The left upright wedge 140 has a rearward facing vertical surface 142 and a rearwardly facing inclined surface 144. The inclined surface 144 also faces upwardly and extends downward and rearward from the bottom of the vertical surface 142. A vertical angled surface 146 is also provided on the left upright wedge 140. The left upright wedge 140 is a hardened steel member. Welds attach the wedge 140 to the side wall 140 in locations where the welds do not interfere with the vertical surface 142, the inclined surface 144 or the vertical angled surface 146.

A right upright wedge 148 is welded to the outside surface of the side wall 122 of the upright 36. The right upright wedge 148 has a rearwardly facing vertical surface 150 and a rearwardly facing inclined surface 152. The inclined surface 152 also faces upwardly and extends downward and rearward from the bottom of the vertical surface 150. A vertical angled surface 154 is also provided on the right upright wedge 148.

Left and right socket assemblies 32 and 34 are secured to the chassis 14 of the tractor 12. The two socket assemblies 32 and 34 are essentially mirror images of each other. The left socket assembly 32 only will be described in detail. Each of the socket assemblies 32 and 34 include a mounting bracket 156 and an upright socket 158. The mounting bracket 156 must be made for the specific tractor 12 to which it attaches. As shown in the drawing the mounting bracket 156 has a vertical plate member 160. The forward end of the plate member 160 is secured to a front casting 162 of the tractor chassis 14 by bolts 164 that pass through bores 166. The rear end of the plate 160 includes several bores 168 for bolts that attach the plate to a center section of the chassis 14. Some tractors have attaching points on the side of the center housing casting. The tractor 12 showing in the drawing has a horizontal attaching surface on the bottom the chassis 14. A transverse horizontal channel member 170 is attached directly to the bottom of the chassis 14. The rear portion of the plate 160 is secured to the left end of the channel member 170 and two members attached to the channel member. The right socket assembly 34 attaches to the right end of the channel member 170. A horizontal tubular member 172 is welded to an outside surface of the vertical plate member 160. An upright socket 158 is welded to the outboard end of the member 172.

The upright socket 158 of the left socket assembly 32 is substantially identical to the right socket of the right socket assembly 34. The upright socket 158 has two parallel fore an aft extending vertical plates 174 and 176. A transverse generally vertical plate 178 is positioned between the two plates 174 and 176 and is welded in place to form a U-shaped channel that opens to the front. If desired the plate 178 could be intrical with one or both of the plates 174 and 176. A horizontal transverse hardened steel pin 180 passes through bores through the plates 174 and 176 and is welded in place. Steel pin 180 is spaced forward of the plate 178 and is above the tubular member 172. A reinforcing plate 182 is welded to the plates 174 and 176, the plate 178 and to the tubular member 172 below the steel pin 180. Bushings 184 are welded into bores through the upper portions of the plates 174 and 176. These bushings 184 receive a locking pin 186 as explained below. Reinforcement plates 188 are welded to the side plates 174 and 176 outside the U-shaped channel to reinforce the bushings 184.

A pair of socket wedges 190 are welded to facing surfaces of the vertical plates 174 and 176 inside the U-shaped channel and above the fixed hardened steel pin 180. The socket wedges 190 are hardened steel and have forward facing vertical surfaces 192 and forward facing inclined surfaces 194. The inclined surfaces 194 also face downward and extend downwardly and rearwardly from the bottom of the vertical surfaces 192. The two wedges 190 are welded to the side plates along edges other than the edges with the vertical surfaces 192 and the inclined surfaces 194.

Tractors generally have an internal hydraulic system that supplies hydraulic fluid under pressure to the bucket cylinders 90 and 98 and to the boom lift cylinders 104 and 112. The fluid can be supplied through internal tractor control valves or through a separate loader control valve. A separate loader pump and oil sump could also be employed to provide hydraulic fluid under pressure. These hydraulic systems are well known and have not therefore been disclosed in this application.

The bucket cylinders 90 and 98 and the boom lift cylinders 104 and 112 are all double acting cylinders. Hydraulic fluid is pumped into one end of a cylinder or the other end to move the piston rod. The bucket cylinders 90 and 98 are connected to the pump and to the sump in parallel. The boom lift cylinders 104 and 112 are also connected to the pump and the sump in parallel. Supplying hydraulic fluid to the bucket cylinders 90 and 98 to extend the rods 94 and 102 rotates the bucket counterclockwise about the pins 46 as shown in FIG. 1, Supplying hydraulic fluid to the boom lift cylinders 104 and 112 to extend the rods 108 and 116 will pivot the boom clockwise about the axis of the pins 42 as seen in FIG. 1 and raise the bucket assembly 44. Reversing the flow of hydraulic fluid will reverse the direction of movement of the bucket 44 and the boom 40.

Figure 3:
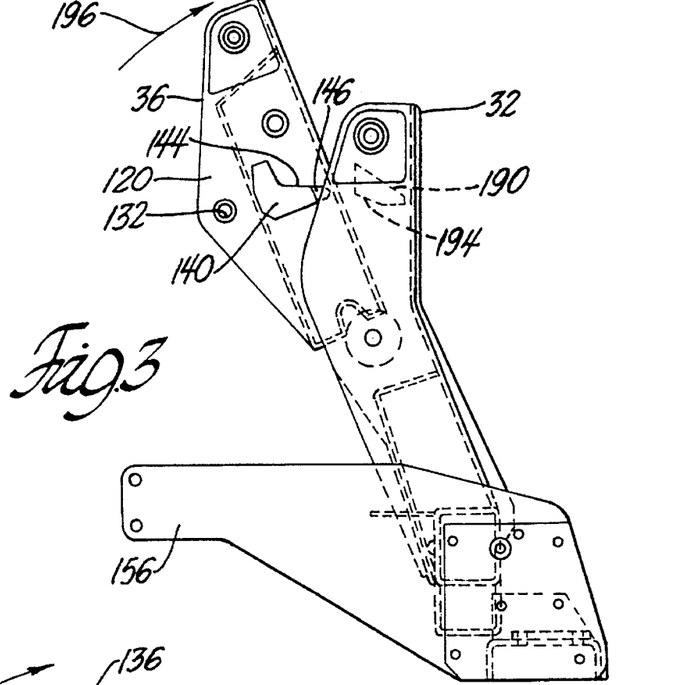
FIG. 3 is a side elevational view of the left socket assembly and the left upright assembly partially inserted into the socket assembly.
Figure 4:
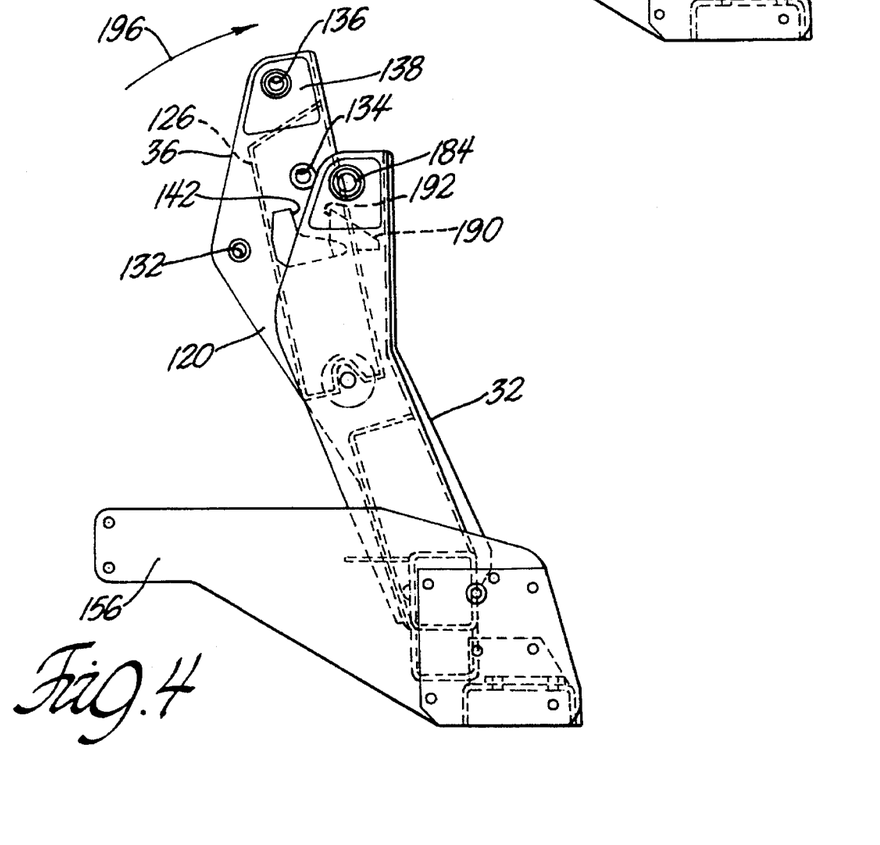
FIG. 4 is a side elevational view similar to FIG. 3 with an upright wedge starting into engagement with a socket wedge.
Figure 5:
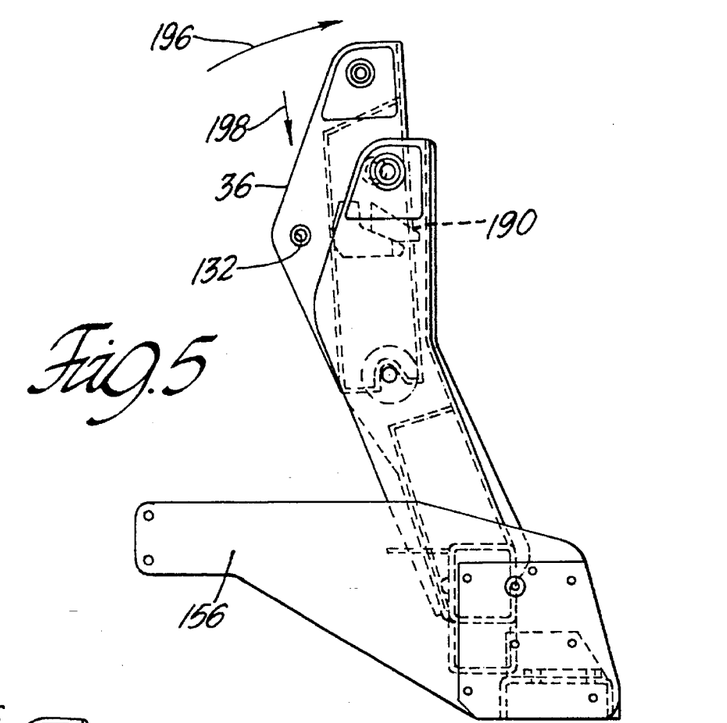
FIG. 5 is a side elevational view similar to FIG. 3 with an upright wedge approaching full engagement with a socket wedge.
Figure 6:
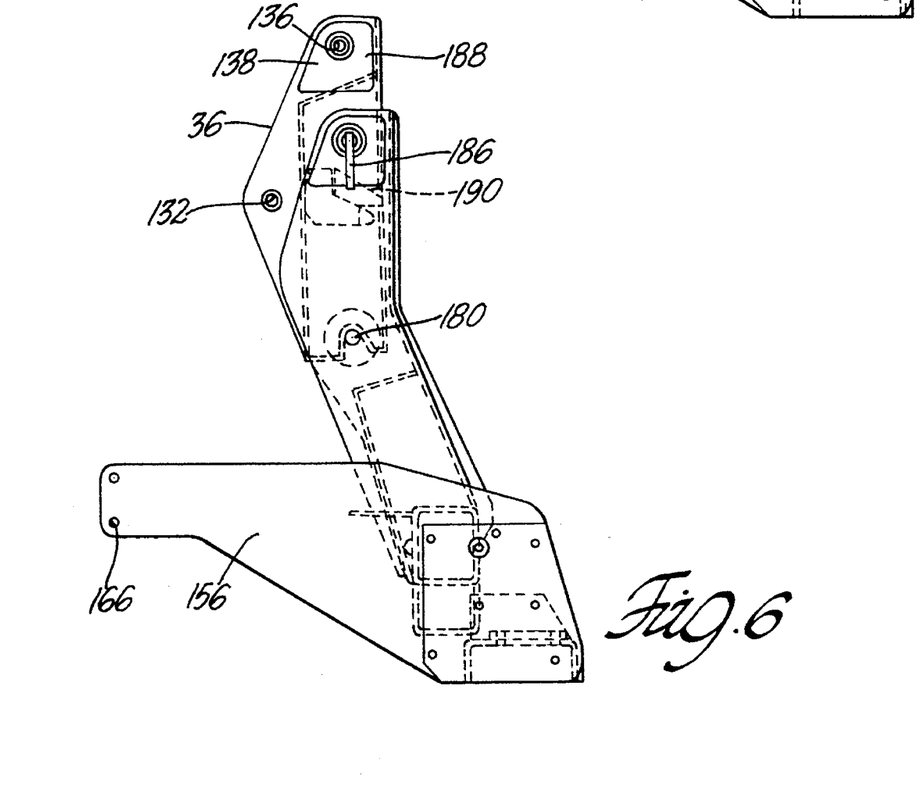
FIG. 6 is side elevational view of a left socket assembly and a left upright assembly with the upright assembly fully seated within the socket assembly and a locking pin inserted.
Figure 7:
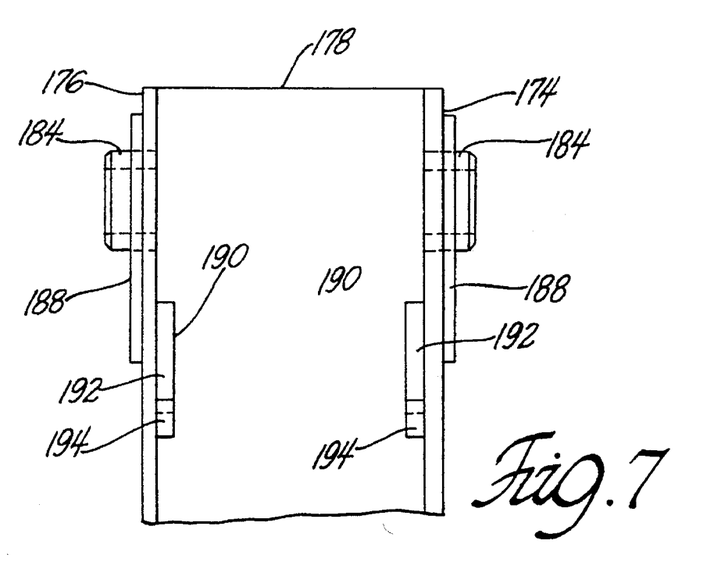
FIG. 7 is a front view of an upper portion of portion of the left socket assembly taken along line 7—7 in FIG. 2.

The loader attachment 30 is attached to the tractor 12, when the loader is supported by the bucket assembly 44 and the support stand assembly 70, by driving the front of the tractor between the right arm 48 and the left arm 50 of the boom assembly 40. When the uprights 36 and 38 are in fore and aft alignment with the socket assemblies 32 and 34, but still out of engagement as shown in FIG. 2, the tractor 12 is stopped. Locking pins 186 are removed and the hydraulic lines on the loader boom 40 are coupled to the tractor hydraulic system. Applicants' U.S. Pat. No. 5,507,530, the disclosure of which is incorporated herein by reference, discloses an apparatus for connecting hydraulic lines. The tractor 12 is then moved forward to move the lower ends of the uprights 36 and 38 into the sockets 158 and align the transverse troughs 128 with the fixed steel pins 180 as shown in FIG. 3. The angled surfaces 146 and 154 on the upright wedges 140 and 148 engage the socket assemblies 32 and 34 as required to move the uprights 36 and 38 laterally and into alignment with the socket assemblies. Continued forward movement of the tractor 12 and rotation of the uprights 36 and 38 about the axis of the pins 42 in the direction shown by the arrows 196 in FIGS. 3, 4 and 5 move the pins 180 partially into the troughs 128 and move the inclined surfaces 144 and 152 on the upright wedges 140 and 148 into engagement with the inclined surfaces 194 on the socket wedges 190 as shown in FIG. 4. Continued pivotal movement of the uprights 36 and 38 in the direction indicated by the arrow 196 in FIG. 5 cams the uprights 36 and 38 downward in the direction indicated by the arrow 198 as shown in FIG. 5. This camming action continues until the vertical surface 142 on the left upright wedge 140 and the vertical surface 150 on the right upright wedge 148 contact the vertical surfaces 192 on engaged wedges 190. Upon contact between the vertical surfaces 142 and 150 and vertical surfaces 192, the pins 180 are fully received in the transverse troughs 128 and the bore 134 is in axial alignment with the bushings 184. The locking pins 186 can then be inserted through the bushings 184 and the bores 134 to lock the uprights 36 and 38 to the socket assemblies 32 and 34.

When the uprights 36 and 38 are locked to the socket assemblies 32 and 34 by the locking pins 186, upward force on the uprights are transferred to the socket assemblies and the tractor chassis 14 through the inclined surfaces 194 on the socket wedges 190 and the adjacent inclined surfaces 144 on the left upright wedges 140 or the inclined surfaces 152 on the right upright wedges 148. Downward forces on the uprights 36 and 38 are transferred to the socket assemblies 32 and 34 through the base portion of the transverse troughs 128 and fixed steel pins 180. Forces to the rear on the uprights 36 and 38 which tend to pivot the uprights about the pins 180 in the direction of the arrows 196 is transferred to the socket assemblies through the vertical surfaces 142 on the wedges 140 and the vertical surfaces 150 on the wedges 148 and the vertical surfaces 192 on the socket wedges 190. The only forces on the uprights 36 and 38 that are transferred to the socket assemblies 32 and 34 through the locking pins 186 are forces that tend to rotate the uprights about the pins 180 in a direction opposite of the arrow 196. The uprights 36 and 38 are forward of and spaced from the plates 178 when the locking pins 186 are holding the uprights in a fixed position relative to the socket assemblies 32 and 34.

During manufacture, the socket wedges 190 are welded to the socket assemblies 32 and 34 in fixed positions relative to the pins 180 and the axis of the bushings 184. The left upright wedges 140 and the right wedges 148 are welded to the uprights 36 and 38 in fixed positions relative to the trough 128 and the pin bore 134. By maintaining close manufacturing tolerances, adjustments are not required to mount a new loader on a tractor or to change a loader from one tractor to another tractor. The hardened steel wedges 140, 148 and 190 substantially eliminate wear so that adjustments are not required after long periods of use. As described above, there are four socket wedges 190 and two left upright wedges 140 and two right upright wedges 148. Loaders attached to smaller tractors could have one wedge 190 only in each socket assembly 32 and 34 and a corresponding wedge 140 or 148 on each upright 36 and 38 thereby eliminated four of the eight wedges.

The loader attachment 30 is described above with a general purpose bucket 44. There are a number of different attachments available that either attach to the bucket 44 or that replace the bucket. It is expected that there will be additional attachments available for use in lieu of the general purpose of bucket in the future. It is also expected that all of these attachments will be useable with the loader mounting structure described above.

A particular embodiment of the present invention have been described in some detail above, changes and modifications may be made in the illustrated embodiments without departing from the spirit of the invention.

I claim:

1. A tractor loader attachment comprising a left socket assembly including a vertical inside plate and a vertical outside plate spaced from the inside plate, adapted to be secured to a tractor chassis;

a right socket assembly including a vertical inside plate and a vertical outside plate spaced from the inside plate, adapted to be secured to a tractor chassis;

a left upright assembly releasably connected to the left socket assembly;

a right upright assembly releasably connected to the right socket assembly;

a boom pivotally attached to the left upright assembly and to the right upright assembly;

a left boom lift cylinder pivotally connected to the boom and the left upright assembly;

a right boom lift cylinder pivotally connected to the boom and the right upright assembly;

an engagable support between the left socket assembly and a lower end of the left upright assembly including a left transverse trough and a left horizontal transverse pin receivable within the left transverse trough;

an engagable support between the right socket assembly and a lower end of the right upright assembly including a right transverse trough and a right horizontal transverse pin receivable within the right transverse trough;

a first left socket wedge positioned between the vertical inside plate and the vertical outside plate of the left socket assembly, above the engagable support between the left socket assembly and the left upright assembly and welded to the vertical inside plate of the left socket assembly and wherein the first left socket wedge has a forward facing generally vertical surface and a forward facing inclined surface extending downwardly and rearwardly;

a first right socket wedge positioned between the vertical inside plate and the vertical outside plate of the right socket assembly, above the engagable support between the right socket assembly and the right upright assembly and welded to the vertical inside plate of the right socket assembly and wherein the first right socket wedge has a forward facing generally vertical surface and a forward facing inclined surface extending downwardly and rearwardly;

a first left upright wedge welded to the left upright assembly and having a rearward facing generally vertical surface in engagement with the forward facing generally vertical surface of the first left socket wedge and an inclined surface in engagement with the left socket wedge forward facing inclined surface;

a first right upright wedge welded to the right upright assembly and having a rearward facing generally vertical surface in engagement with the forward facing generally vertical surface of the first right socket wedge and an inclined surface in engagement with the right socket wedge forward facing inclined surface;

a left locking pin passing through an aperture through the left socket assembly and an aligned aperture through the left upright assembly; and a right locking pin passing through an aperture through the right socket assembly and an aligned aperture through the right upright assembly.

2. A tractor loader attachment as set forth in claim 1 further comprising a second left socket wedge positioned between the vertical inside plate and the vertical outside plate of the left socket assembly, above the engagable support between the left socket assembly and the left upright assembly and welded to the vertical outside plate of the left socket assembly and wherein the second left socket wedge has a forward facing generally vertical surface and a forward facing inclined surface extending downwardly and rearwardly;

a second right socket wedge positioned between the vertical inside plate and the vertical outside plate of the right socket assembly, above the engagable support between the right socket assembly and the right upright assembly and welded to the vertical outside plate of the right socket assembly and wherein the second right socket wedge has a forward facing generally vertical surface and a forward facing inclined surface extending downwardly and rearwardly;

a second left upright wedge welded to the left upright assembly and having a rearward facing generally vertical surface in engagement with the forward facing generally vertical surface of the second left socket wedge and an inclined surface in engagement with the second left socket wedge forward facing inclined surface; and a second right upright wedge welded to the right upright assembly and having a rearward facing generally vertical surface in engagement with the forward facing generally vertical surface of the second right socket wedge and an inclined surface in engagement with the second right socket wedge forward facing inclined surface.

3. A tractor loader attachment as set forth in claim 1 further comprising a left socket assembly transverse plate positioned between the vertical outside plate and the vertical inside plate of the left socket assembly, spaced to the rear of the left upright assembly and secured to the vertical outside plate and the vertical inside plate of the left upright assembly; and a right socket assembly transverse plate positioned between the vertical outside plate and the vertical inside plate of the right socket assembly, spaced to the rear of the right upright assembly and secured to the vertical outside plate and the vertical inside plate of the right upright assembly.

4. A tractor loader attachment as set forth in claim 1 wherein the left transverse trough is integral with the lower end of the left upright assembly and the left horizontal transverse pin is integral with the left socket assembly; and the right transverse trough is integral with the lower end of the right upright assembly and the right horizontal transverse pin is integral with the right socket assembly.

5. A tractor loader attachment as set forth in claim 2 wherein the left transverse trough is integral with the lower end of the left upright assembly and the left horizontal transverse pin is integral with the left socket assembly; and the right transverse trough is integral with the lower end of the right upright assembly and the right horizontal transverse pin is integral with the right socket assembly.

6. A tractor loader attachment comprising a left socket assembly including a vertical inside plate and a vertical outside plate spaced from the inside plate, adapted to be secured to a tractor chassis;

a right socket assembly including a vertical inside plate and a vertical outside plate spaced from the inside plate, adapted to be secured to a tractor chassis;

a left upright assembly releasably connected to the left socket assembly;

a right upright assembly releasably connected to the right socket assembly;

a boom pivotally attached to the left upright assembly and to the right upright assembly;

a left boom lift cylinder pivotally connected to the boom and the left upright assembly;

a right boom lift cylinder pivotally connected to the boom and the right upright assembly;

an engagable support between the left socket assembly and a lower end of the left upright assembly including a left transverse trough and a left horizontal transverse pin receivable within the left transverse trough;

an engagable support between the right socket assembly and a lower end of the right upright assembly including a right transverse trough and a right horizontal transverse pin receivable within the right transverse trough;

a first left socket wedge positioned between the vertical inside plate and the vertical outside plate of the left socket assembly, above the engagable support between the left socket assembly and the left upright assembly and welded to the vertical outside plate of the left socket assembly and wherein the first left socket wedge has a forward facing generally vertical surface and a forward facing inclined surface extending downwardly and rearwardly.

a first right socket wedge positioned between the vertical inside plate and the vertical outside plate of the right socket assembly, above the engagable support between the right socket assembly and the right upright assembly and welded to the vertical outside plate of the right socket assembly and wherein the first right socket wedge has a forward facing generally vertical surface and a forward facing inclined surface extending downwardly and rearwardly;

a first left upright wedge welded to the left upright assembly and having a rearward facing generally vertical surface in engagement with the forward facing generally vertical surface of the first left socket wedge and an inclined surface in engagement with the left socket wedge forward facing inclined surface;

a first right upright wedge welded to the left upright assembly and having a rearward facing generally vertical surface in engagement with the forward facing generally vertical surface of the first right socket wedge and an inclined surface in engagement with the right socket wedge forward facing inclined surface.

a left locking pin passing through an aperture through the left socket assembly and an aligned aperture through the left upright assembly; and a right locking pin passing through an aperture through the right socket assembly and an aligned aperture through the right upright assembly.

* * * * *